(12) United States Patent
Dochow et al.

(10) Patent No.: US 11,209,818 B2
(45) Date of Patent: Dec. 28, 2021

(54) METHOD AND DEVICE FOR AUTOMATED DRIVING WITH A SAFE STOP POINT

(71) Applicant: Continental Automotive GmbH, Hannover (DE)

(72) Inventors: Gerhard Dochow, Hannover (DE); Stefan Bieger, Hannover (DE)

(73) Assignee: Continental Automotive GmbH

(*) Notice: Subject to any disclaimer, the term of this patent is extended or adjusted under 35 U.S.C. 154(b) by 58 days.

(21) Appl. No.: 16/491,898

(22) PCT Filed: Mar. 6, 2018

(86) PCT No.: PCT/EP2018/055484
§ 371 (c)(1),
(2) Date: Sep. 6, 2019

(87) PCT Pub. No.: WO2018/162489
PCT Pub. Date: Sep. 13, 2018

(65) Prior Publication Data
US 2020/0012276 A1     Jan. 9, 2020

(30) Foreign Application Priority Data

Mar. 7, 2017 (DE) .................... 10 2017 203 678.8

(51) Int. Cl.
*G05D 1/00*     (2006.01)
*B60W 50/14*     (2020.01)
(Continued)

(52) U.S. Cl.
CPC ........... *G05D 1/0061* (2013.01); *B60W 50/14* (2013.01); *G05D 1/021* (2013.01);
(Continued)

(58) Field of Classification Search
CPC ..... G05D 1/0061; G05D 1/021; B60W 50/14; B60W 2540/215; B60W 2040/0827;
(Continued)

(56) References Cited

U.S. PATENT DOCUMENTS

2012/0078509 A1    3/2012   Choi
2016/0170410 A1    6/2016   Ichikawa et al.
(Continued)

FOREIGN PATENT DOCUMENTS

| | | |
|---|---|---|
| DE | 102013013867 A1 | 3/2015 |
| EP | 2314490 B1 | 8/2012 |
| JP | 2015133050 A | 7/2015 |

OTHER PUBLICATIONS

International Search Report and Written Opinion dated Aug. 8, 2019 from corresponding International Patent Application No. PCT/EP2018/055484.
(Continued)

*Primary Examiner* — Rodney A Butler

(57) ABSTRACT

A method for controlling the operation of an automatic driving assistance system of a motor vehicle, which is designed for independent vehicle guidance. When at least one driving control takeover condition is met which brings about deactivation of the driving assistance system when driving control is taken over by the driver, at least one takeover request is output to the driver. If the driver does not react to this takeover request, replanning of the original route occurs with an original destination to a stopping point which can be approached in an automated manner. The replanning occurs in such a way that the stopping point constitutes, in the context of the present position of the motor vehicle with respect to the original destination, an optimum stopping point which is determined according to at least one optimality criterion.

14 Claims, 5 Drawing Sheets

(51) Int. Cl.
*G05D 1/02* (2020.01)
*B60W 40/08* (2012.01)

(52) U.S. Cl.
CPC . *B60W 2040/0827* (2013.01); *B60W 2520/04* (2013.01); *B60W 2540/215* (2020.02)

(58) Field of Classification Search
CPC ........ B60W 2520/04; B60W 60/0053; B60W 60/0015; B60W 2540/26; B60W 2556/50; B60W 30/06; G01C 21/343; G01C 21/3438; B60K 28/06; B62D 15/0285
See application file for complete search history.

(56) References Cited

U.S. PATENT DOCUMENTS

| | | | |
|---|---|---|---|
| 2016/0200317 A1 | 7/2016 | Danzl et al. | |
| 2019/0225217 A1* | 7/2019 | Tsukada | B60W 60/0053 |
| 2019/0300007 A1* | 10/2019 | Hilligardt | B60W 60/0018 |
| 2020/0150667 A1* | 5/2020 | Rakshit | G01C 21/30 |
| 2020/0242929 A1* | 7/2020 | Sailer | B60L 53/66 |

OTHER PUBLICATIONS

Polizei ordnet Zwangspause für Busfahrer an; Pressemitteilung des Polizeipräsidiums Südhessen http://www.presseportal.de/blaulicht/pm/4969/3565569.

Peter Mirwaldt; Funktionsentwicklung eines Nothalteassistenzsystems bei kardiovaskulär bedingter Fahrunfähigkeit;Berichte aus dem DLR-Institut für Verkehrssystemtechnik, Band 26.

In Freising wehen die Alkohol-Fahnen; Münchner Merkur online https://www.merkur.de/lokales/freising/freising-ort28692/freising-oktoberfeststart-betrunkene-autofahrer-freising-erwischt-6757476.html.

* cited by examiner

METHOD AND DEVICE FOR AUTOMATED DRIVING WITH A SAFE STOP POINT

BACKGROUND

The invention relates to the field of driving assistance systems and, in particular, to the field of automated driving.

Modern motor vehicles have a multiplicity of different driving assistance functions which assist the driver in planning routes or in guiding the vehicle.

During automated driving, situations can occur in which the driver has to take over the driving function, for example when a route section is reached which cannot be traveled along in an automated fashion. If the driver is not able to take over control of the vehicle, the automated guidance must nevertheless be ended safely. The immediate automated emergency stop in the case of non-takeover by the driver can endanger the traffic traveling behind and the vehicle itself.

BRIEF SUMMARY

It is therefore an object of the invention to disclose a method for controlling the operation of an automatic driving assistance system, which is designed for independent vehicle guidance and operates reliably and safely.

This object is achieved with a method according to the independent method claim and a device according to the independent device claim. The dependent claims contain advantageous configurations.

A method for controlling the operation of an automatic driving assistance system of a motor vehicle, which is designed for independent vehicle guidance. When at least one driving control takeover condition is met which brings about deactivation of the driving assistance system when driving control is taken over by the driver, at least one takeover request is output to the driver. If the driver does not react to this takeover request, replanning of the original route occurs with an original destination to a stopping point which can be approached in an automated manner. The replanning occurs in such a way that the stopping point constitutes, in the context of the present position of the motor vehicle with respect to the original destination, an optimum stopping point which is determined according to at least one optimality criterion.

As result of the replanning of the route to a stopping point which can be approached in an automated fashion, an immediate emergency stop can be avoided. In addition, replanning is carried out in such a way that in the context of the planning the stopping point is an optimum solution with respect to one or more criteria. These criteria can be, for example: the shortest or fastest route from the stopping point to the original destination; best possibility of accessing public transportation means with which the original destination can be reached in the shortest or cheapest way, proximity to specific medical facilities such as an emergency department or hospitals, possibility of a safe emergency stop.

There can be provision that the replanning of the original route does not occur until the takeover of driving control by the driver does not occur after a minimum number of driving control takeover requests. A visual or acoustic message can optionally be issued to the driver to the effect that if the driving control is not taken over a further time, the original route will be replanned by the driving assistance system. In this context, a selection of optimality criteria according to which replanning can be carried out can be issued to the driver, from which criteria the driver can make an intentional selection insofar as he is able to do so. Alternatively, the optimality criterion can also be preset. The possibility of a safe emergency stop just before the optimum stopping point is reached when the driving control is not taken over can be provided as a fallback criterion.

Within the scope of the replanning there can be provision for the driver to be requested again to take over control of the vehicle just before the optimum stopping point which is determined in this way is reached. If a takeover control of the vehicle does not occur again, the vehicle is stopped safely at the optimum stopping point and parked.

In one configuration of the invention, the replanning of the original route is carried out in such a way that the optimum stopping point has a shortest or fastest route to the original destination which cannot be traveled along in an automated fashion. The fastest route can be determined here by taking into account the current traffic volume and any roadworks. If the driver has not reacted to a takeover request which has occurred for example in the vicinity of a freeway exit which is provided within the scope of the original route planning and from which it was no longer possible to drive in an automated fashion to the original destination, the vehicle is now navigated to a further freeway exit, and the further freeway exit is selected as a stopping point with respect to the original destination, such that the route from the further freeway exit to the original destination is a shortest or fastest route. In this way, in the context of the present position of the motor vehicle with respect to the original destination the driver can nevertheless arrive at the destination along the shortest or fastest path to the destination if he takes over control of the vehicle just before the optimum stopping point and controls it from there manually to the original destination.

If the driver does not take over control of the vehicle despite a further takeover request which has occurred just before the optimum stopping point, the vehicle is stopped safely at the optimum stopping point and parked. If the driver has missed this further takeover request or has intentionally not reacted to it because he is, for example, unfit to drive, the optimum stopping point constitutes a location from which the driver can be picked up, for example, by relatives or colleagues, along the shortest or fastest path with respect to the original destination.

In one configuration of the invention, the replanning of the original route is carried out in such a way that the optimum stopping point has a shortest or fastest route to a stop for public transportation means. If, in turn, the driver is unfit to drive, he can intentionally decide that the replanning of the original route occurs correspondingly and in this way he can continue his journey with public transportation means insofar as the stop for public transportation means can still be approached in an automated fashion. The optimum stopping point can be determined here in such a way that the stop for public transportation means is located in such way that the original destination can be reached with the public transportation means in the shortest time. The current availability of public transportation means can also be taken into account here. Therefore, the driving assistance system can issue an enquiry to local transportation companies or to a supra-regional railway company with respect to the current availability of public transportation means. In this context, the driving assistance system can access, via a mobile radio interface, portals of the local transportation companies or of the supra-regional railway company which are available on the Internet and request the corresponding information there.

In one configuration of the invention it is determined whether a health impairment is present which, for example, makes the driver unfit to drive. The driving assistance system can for this purpose have a correspondingly configured passenger compartment sensor system. If it has been determined that the driver's health is impaired, the replanning of the original route can take place in such way that the optimum stopping point has a shortest or fastest route to a facility for emergency medical treatment, such as an emergency department or a hospital. At the same time, an emergency call can be issued to the corresponding medical facility. In this context, the optimum stopping point is preferably communicated so that emergency vehicles can drive directly to this optimum stopping point. As result of the motor vehicle being able to move in this way, valuable time can be saved in comparison to a scenario in which an emergency stop of the motor vehicle is performed at the next opportunity.

In one configuration of the invention, automated parking of the vehicle is brought about at the optimum stopping point. This has the advantage that if the driver is unfit to drive, the vehicle does not have to be parked by third parties and is located in a position in which it does not constitute a danger for other road users.

The invention further relates to a driving assistance system for a motor vehicle, comprising: a driver interface configured to output least one driving control takeover request to a driver when at least one driving control takeover condition is met, which driving control takeover condition brings about deactivation of the driving assistance system when driving control is taken over by the driver; and a navigation system configured to replan an original route with an original destination, when the driving control is not taken over by the driver, to a stopping point which can be approached in an automated manner, wherein the stopping point constitutes, in the context of the present position of the motor vehicle with respect to the original destination, an optimum stopping point which is determined according to at least one criterion. The navigation system can additionally have mobile radio interface for communication with a backend or for accessing the Internet.

In some configurations, the driving assistance system has a passenger compartment sensor system for determining whether the driver is medically impaired, and a transceiver device for issuing an emergency call to a medical facility.

BRIEF DESCRIPTION OF THE FIGURES

The invention will be described below on the basis of example embodiments and with reference to figures, in which.

DETAILED DESCRIPTION

Figure 1:
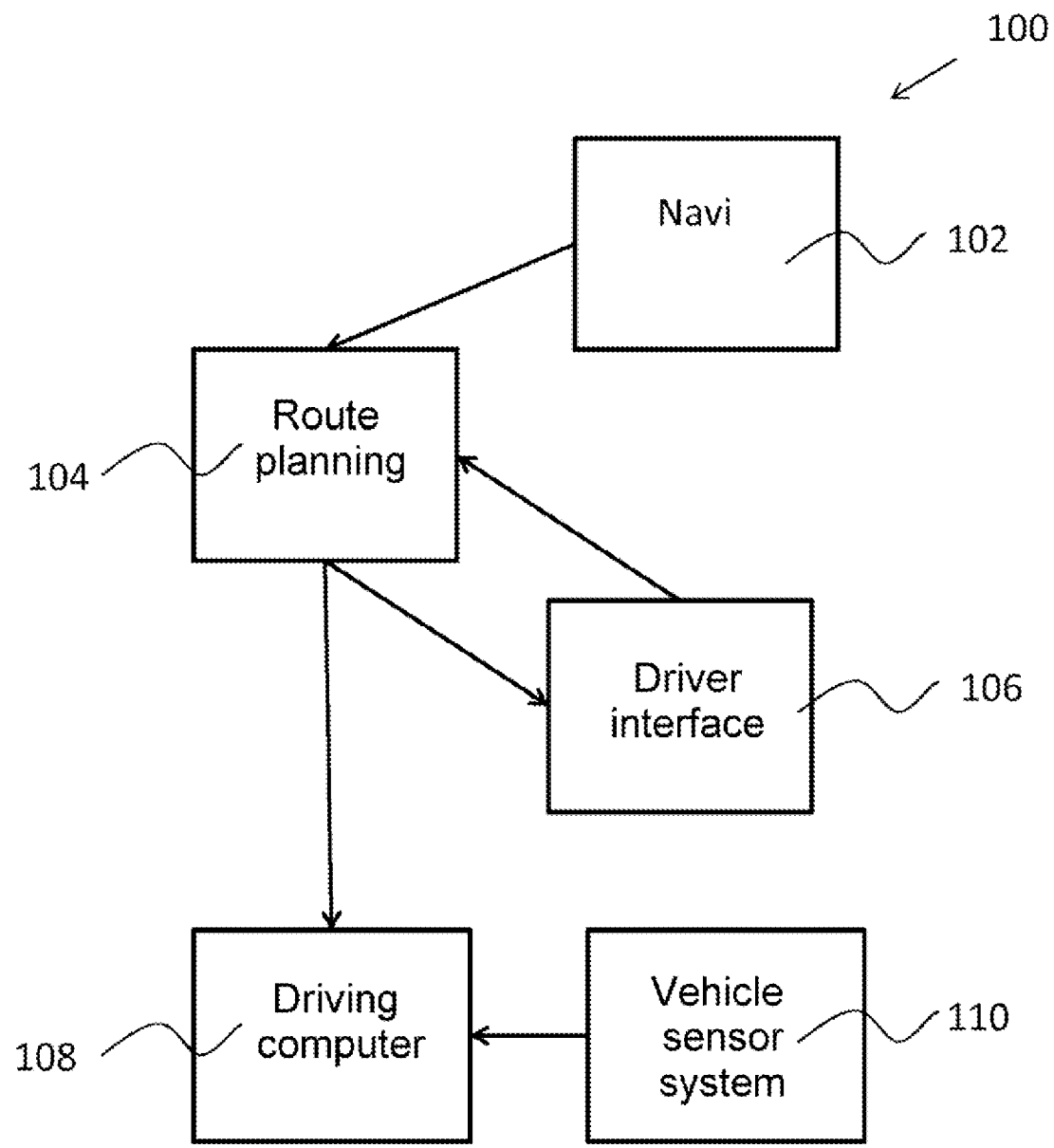
FIG. 1 shows a block circuit diagram of a driving assistance system

FIG. 1 shows a block circuit diagram of a driving assistance system 100 having a navigation system 102, a route planning unit 104 as a central unit, a driver interface 106, a driving computer 108 and a vehicle sensor system 110.

The navigation system 102 is communicatively connected to the route planning unit 104 and provides it with an electronic map with a database for emergency stopping points as well as the current position and the speed. The route planning unit 104 is communicatively connected to the driving computer 108 and configured to transmit a route specification to the driving computer 108. The driving computer 108 controls the steering, driving and brakes of the vehicle on the basis of the route specification. For this purpose, the driving computer 108 accesses sensor data acquired by means of the vehicle sensor system 110, such as radar data, camera data, image recognition data, position and speed of the vehicle.

Figure 2:
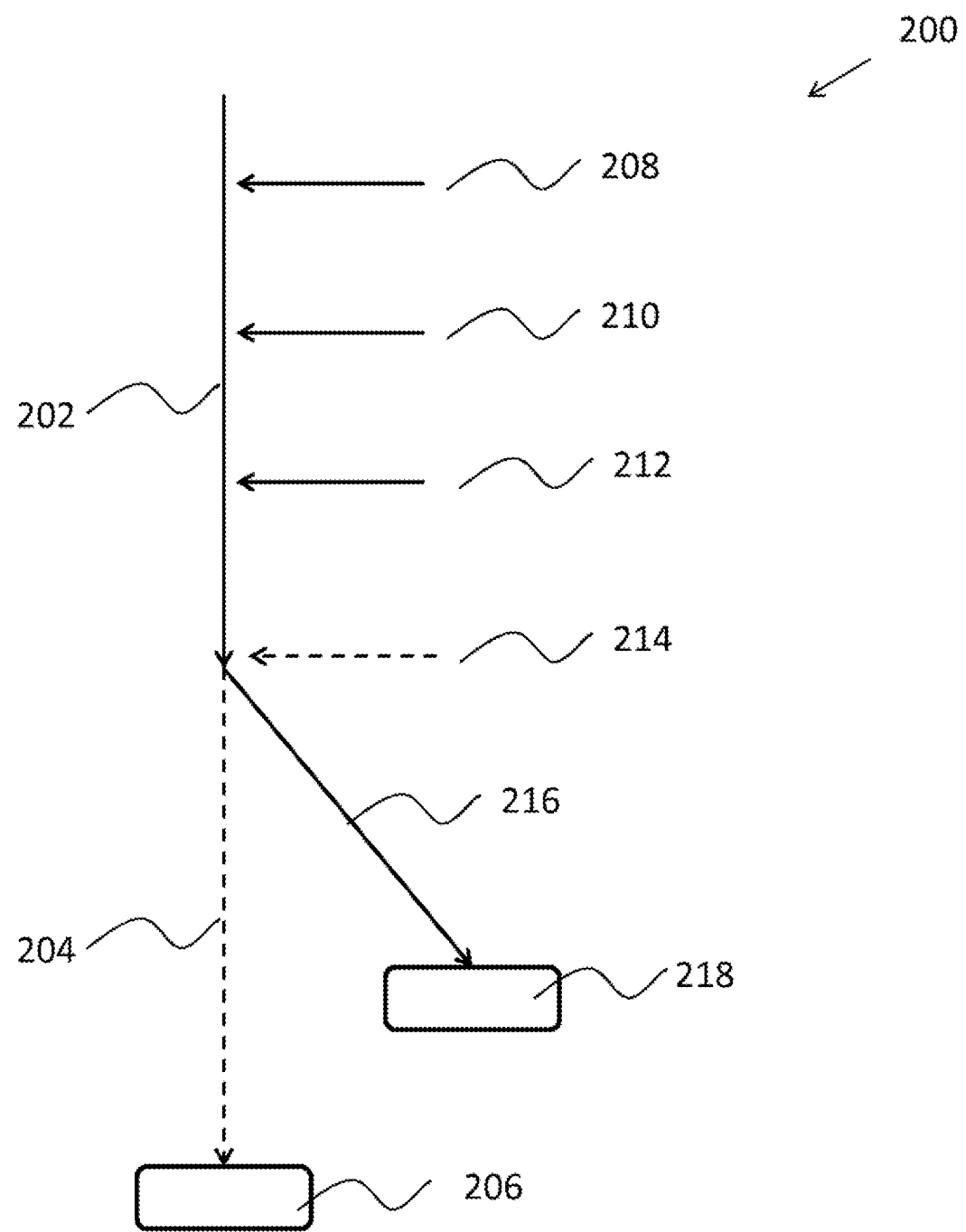
FIG. 2 shows a takeover sequence

The function of the route planning unit 104 is described in conjunction with FIG. 2. The route planning unit 104 is configured to generate, within the scope of an original route planning operation 200 with a route section 202 which can be traveled along in an automated fashion and a route section 204 which cannot be traveled along in an automated fashion, to an original destination 206 before the travel section 204 which can no longer be traveled on in an automated fashion is reached, a minimum number of appropriately timed takeover requests 208, 210, 212, 214 by taking into account possible emergency stopping locations and possible alternative routes 216 which can still be traveled along in an automated fashion. The takeover requests 208, 210, 212, 214 are communicated by the route planning unit 104 to the driver interface 106. The driver interface 106 requests the driver to take over control of the vehicle in accordance with the takeover requests 208, 210, 212 generated by the route planning unit 104. The driver interface 106 communicates to the route planning unit 104 whether or not the driver has taken over control of the vehicle control means. If the driver has taken over control, the units of the driving assistance system, which are required exclusively for automated driving, are switched off. If the driver has definitively not taken over control in accordance with the last takeover request 214 before the route section 204 which can no longer be traveled along in an automated fashion is reached, the route planning unit 104 calculates an alternative route 216, which can still be traveled along in an automated fashion, to a safe stopping point 218. The safe stopping point is optimized in the context of the route planning with respect to the original destination, i.e. it does not have to be the next possible safe stopping point but rather is selected on the basis of specific optimality criteria.

Figure 3:
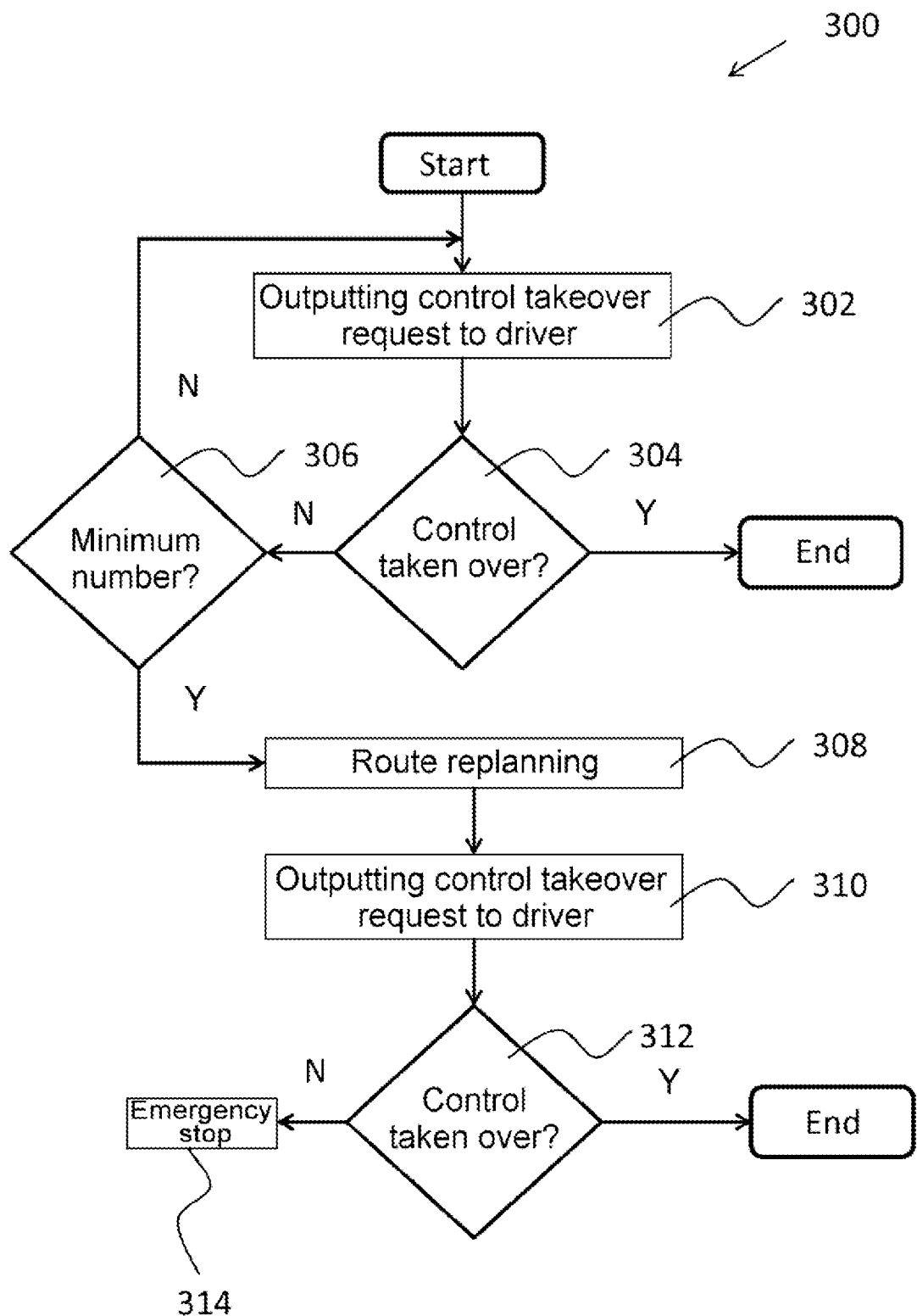
FIG. 3 shows a flow diagram of an embodiment of the method

FIG. 3 shows a flow diagram 300 corresponding to a configuration of the method. In step 302, takeover requests are issued to the driver. In step 304 it is determined whether control of the vehicle has been taken over. If this is the case, the method is ended and the driving assistance system switches off. If this is not the case, in step 306 it is determined whether a minimum number of takeover requests has been exceeded. If this is not the case, the method is continued in step 302. If this is not the case, route replanning to an optimum stopping point takes place in step 308. Before the optimum stopping point is reached, in step 310 a takeover request is issued again to the driver. In step 312 it is determined whether control of the vehicle has been taken over. If this is the case, the method is ended and the driving assistance system switches off. If this is not the case, an emergency stop 214 of the vehicle takes place at the optimum stopping point. The emergency stop can be connected to automated parking.

In a further exemplary embodiment, the route planning unit is designed to transmit the optimum emergency stop and newly planned route to the driver interface 106, which in turn displays this information visually or indicates it acoustically to the driver.

Figure 4:
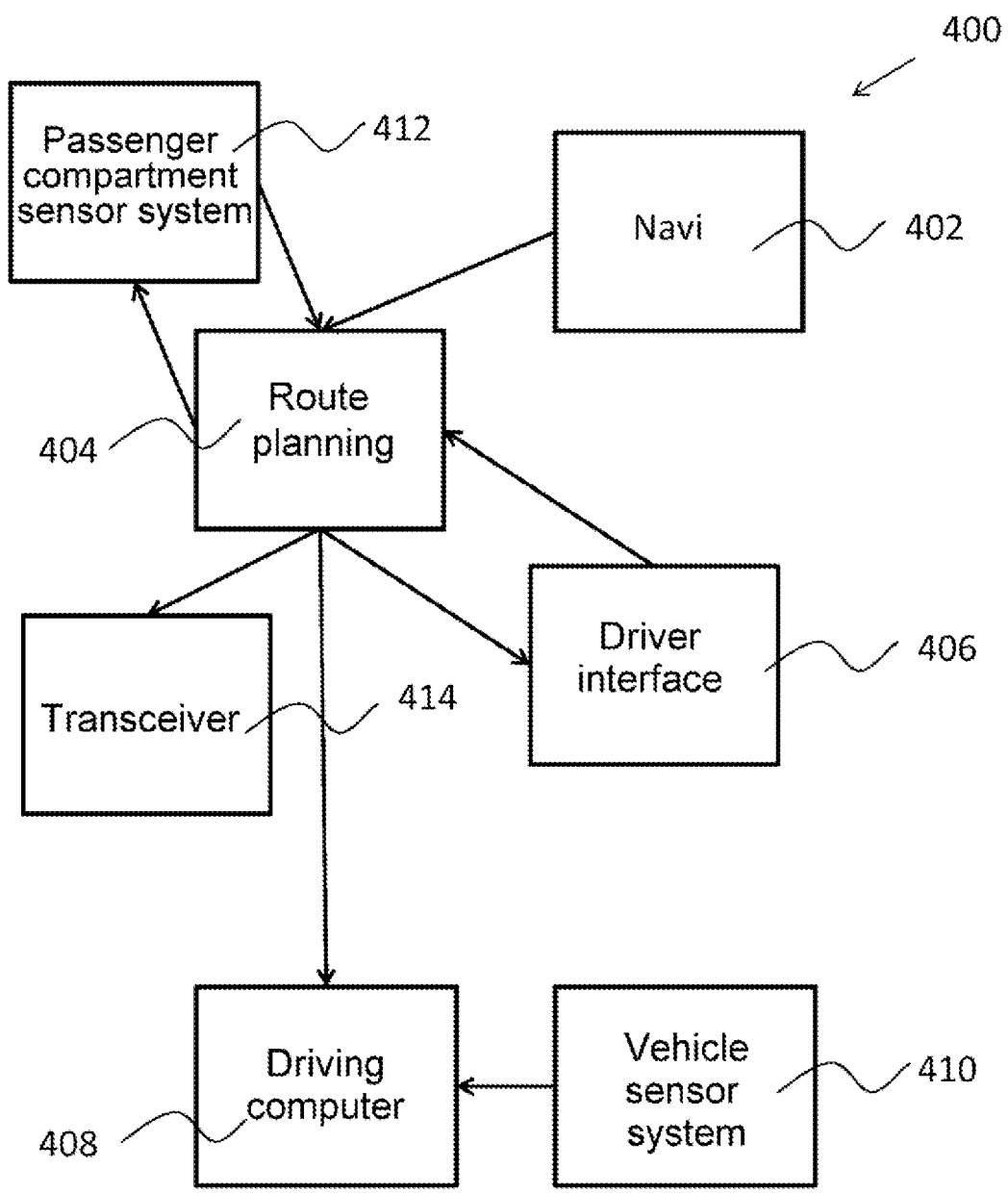
FIG. 4 shows a block circuit diagram of a driving assistance system with detection of medical impairments

FIG. 4 shows a block circuit diagram of a driving assistance system 400 according to a further configuration which is described with respect to FIG. 2. In comparison to the driving assistance system 100 shown in FIG. 1, the driving assistance system 400 additionally has a passenger compartment sensor system 412 and a transceiver unit 414. The passenger compartment sensor system 412 can have, for example, passenger compartment camera or a fitness armband and is designed to detect possible medical impairment of the driver. Medical impairment is understood to be any irregular deviation from normal physical or cognitive body functions which can result in restriction of the ability to drive or unfitness to drive on the part of the driver, such as fatigue, sleepiness, unconsciousness, consumption of drugs, consumption of alcohol, heart attack. The route planning unit 404 requests this information from the passenger compartment sensor system 412. The route planning unit 404 is configured to generate, within the scope of an original route planning operation 200 with a route section 202 which can be traveled along in an automated fashion and a route section 204 which cannot be traveled along in an automated fashion, to an original destination 206 before the travel section 204 which can no longer be traveled on in an automated fashion is reached, a minimum number of appropriately timed takeover requests 208, 210, 212, 214 and to transmit this to the driver interface 406. The driver interface 406 communicates to the route planning unit 404 whether or not the driver has taken over control of the vehicle control means. If the driver has taken over control, the units of the driving assistance system, which are required exclusively for automated driving, are switched off.

If the driver has not taken over control after the first takeover request 208, the route planning unit 404 requests, from the passenger compartment sensor system 412, the information about possible medical impairment of the driver. If such medical impairment is detected, the passenger compartment sensor system 412 transmits this information to the route planning unit 404. The route planning unit replans the original route in such a way that an optimum stopping point is determined which can still be approached in an automated fashion and which has a shortest or fastest route to a facility for emergency medical treatment, such as an emergency department or a hospital. Moreover, the route planning unit 404 can be configured to prevent the driver from taking over control of the driving until the optimum stopping point is reached, so as not to place the driver in danger unnecessarily.

Moreover, the driving assistance system 400 has a transceiver unit 414. The transceiver unit 414 is configured to issue an emergency call to the corresponding medical facility. The optimum stopping point is communicated so that emergency vehicles can drive directly to this optimum stopping point.

In accordance with the severity of the detected medical impairment, the route planning unit 404 can trigger a dialogue with the driver via the driver interface to determine whether a facility for emergency medical treatment is to be headed for or whether replanning of the route to a stopping point in the vicinity of the original destination is to take place.

If the passenger compartment sensor system 412 detects, for example, loss of consciousness or a stroke, this dialogue is omitted and the route is replanned to a facility for emergency medical treatment, and an emergency call is issued. If the passenger compartment sensor system 412 does not detect such a serious impairment, the dialogue takes place via the driver interface 406. In particular it is asked whether an emergency call is to be issued.

The passenger compartment sensor system 412 can be designed to monitor possible medical impairment of the driver continuously, whether or not control of the vehicle is taken over, and to communicate this information to the route planning unit 404. The route planning unit 404 can subsequently perform replanning of the route to a medical facility with, if appropriate, a preceding dialogue with the driver.

Figure 5:
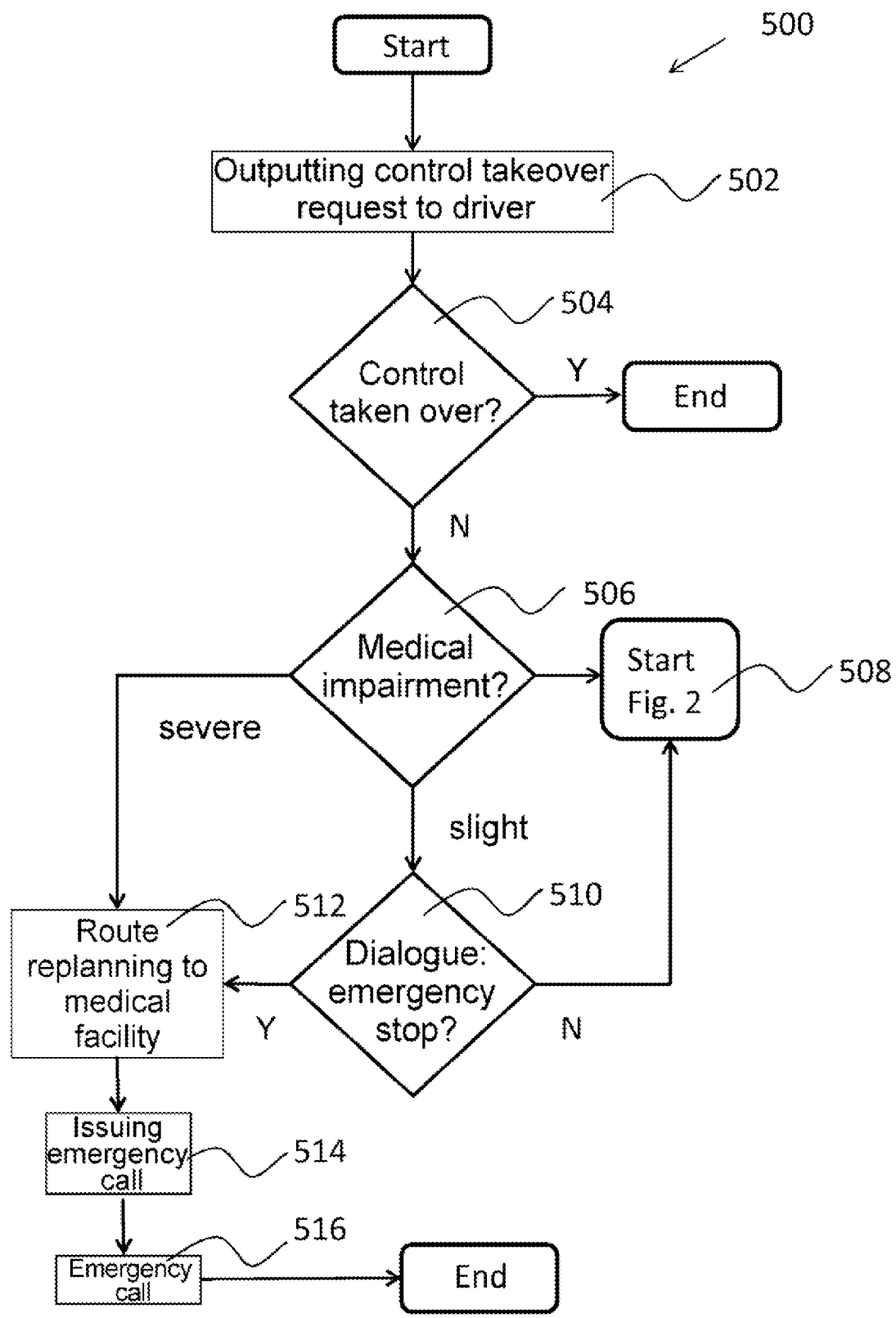
FIG. 5 shows a flow diagram of an embodiment of the method with detection of medical impairments.

FIG. 5 shows a flow diagram of the method for controlling the driving assistance system. In step 502, a takeover request is issued to the driver. In step 504 it is checked whether control of the vehicle has been taken over by the driver. If this is the case, the driving assistance system relating to the part for automated guidance of the vehicle is switched off. If this is not the case, in step 506 it is determined whether the driver is medically impaired. If this is not the case, in step 508 the method is continued to its beginning (start), as described in FIG. 2. If a slight medical impairment of the driver is determined, in step 510 a dialogue is carried out with the driver as to whether an emergency stop is to be carried out at or in the vicinity of a facility for emergency medical treatment. If the driver replies negatively to this, in step 508 the method is continued to its beginning (start) as described in FIG. 2. However, if the driver replies positively to this, in step 512 route re-planning to a facility for emergency medical treatment is carried out. If, on the other hand, in step 506 it is detected that a severe medical impairment of the driver, such as a stroke, heart-attack, loss of consciousness has occurred, the dialogue with the driver is omitted, and the method is continued directly in step 506 with route replanning. In step 514, an emergency call is issued and the emergency stop is communicated to the facility for emergency medical treatment. In step 516, the emergency stop takes place and the driving assistance system switches off.

The stopping point for the emergency stop is selected such that there is optimum access for emergency vehicles. In this context, the time for the transfer to the emergency vehicles or the total time until the facility for emergency medical treatment is reached can be minimized taking into account the current traffic volume and the weather conditions.

The current autonomous driving systems always permit an automated driving style only for route sections which are relatively easy to drive on, such as for example freeway sections. Particularly at the end of these route sections, the takeover by the driver is a precondition, without taking into account the hazard potential of this route section, so that even very unfavorable or dangerous route sections, for example roadworks, exits, intersections, constrictions of the roadway are possible, or even probable, for an emergency stop in the event of failure of a takeover of control by the driver. This is avoided by the forward looking aspect of the driving automation system which, in the event of a failure by the driver to take over control, approaches a safe emergency stopping possibility and brings the vehicle to a standstill in a non-blocking situation and in surroundings which are as safe as possible, wherein in the context of journey planning to the original destination the emergency stop possibility constitutes an optimum stopping point.

The invention claimed is:

1. A method for controlling the operation of an automatic driving assistance system of a motor vehicle, which is designed for independent vehicle guidance, comprising:

outputting at least one driving control takeover request to a driver when at least one driving control takeover condition is met, which driving control takeover condition brings about deactivation of the driving assistance system when driving control is taken over by the driver;

when the driving control is not taken over by the driver: replanning an original route with an original destination to a stopping point which can be approached in an automated manner, wherein the stopping point constitutes, in the context of the present position of the motor vehicle with respect to the original destination, an optimum stopping point which is determined according to at least one optimality criterion, wherein the replanning of the original route is carried out in such a way that the optimum stopping point has a shortest or fastest route to the original destination which cannot be traveled along in an automated fashion.

2. The method as claimed in claim 1, wherein the replanning of the original route is carried out in such a way that the optimum stopping point has a shortest or fastest route to a stop for public transportation means.

3. The method as claimed in claim 2, wherein the stop for public transportation means is located in such way that the original destination can be reached with the public transportation means in the shortest time.

4. The method as claimed in claim 3, also comprising: replanning the original route when the takeover of driving control by the driver does not occur after a minimum number of driving control takeover requests.

5. The method as claimed in claim 4, also comprising: determining whether the driver's health is impaired; and when the driver's health is determined to be impaired:
    replanning of the original route is carried out in such a way that the optimum stopping point has a shortest or fastest route to a facility for emergency medical treatment.

6. The method as claimed in claim 5, also comprising: when the driver's health is determined to be impaired: issuing an emergency call to the facility for emergency medical treatment.

7. The method as claimed in claim 6, also comprising: bringing about automated parking of the vehicle at the optimum stopping point.

8. A driving assistance system for a motor vehicle, comprising: a driver interface configured to output at least one driving control takeover request to a driver when at least one driving control takeover condition is met, which driving control takeover condition brings about deactivation of the driving assistance system when driving control is taken over by the driver; and a route planning device configured to replan an original route with an original destination, when the driving control is not taken over by the driver, to a stopping point which can be approached in an automated manner, wherein the stopping point constitutes, in the context of the present position of the motor vehicle with respect to the original destination, an optimum stopping point which is determined according to at least one criterion, wherein the replanning of the original route is carried out in such a way that the optimum stopping point has a shortest or fastest route to the original destination which cannot be traveled along in an automated fashion.

9. The driving assistance system as claimed in claim 8, wherein the replanning of the original route is carried out in such a way that the optimum stopping point has a shortest or fastest route to a stop for public transportation means.

10. The driving assistance system as claimed in claim 9, wherein the stop for public transportation means is located in such way that the original destination can be reached with the public transportation means in the shortest time.

11. The driving assistance system as claimed in claim 10, also comprising: replanning the original route when the takeover of driving control by the driver does not occur after a minimum number of driving control takeover requests.

12. The driving assistance system as claimed in claim 11, also comprising: determining whether the driver's health is impaired; and when the driver's health is determined to be impaired: replanning of the original route is carried out in such a way that the optimum stopping point has a shortest or fastest route to a facility for emergency medical treatment.

13. The driving assistance system as claimed in claim 12, also comprising: when the driver's health is determined to be impaired: issuing an emergency call to the facility for emergency medical treatment.

14. The driving assistance system as claimed in claim 13, also comprising: bringing about automated parking of the vehicle at the optimum stopping point.

\* \* \* \* \*